(12) United States Patent
Koganei

(10) Patent No.: US 11,552,711 B2
(45) Date of Patent: Jan. 10, 2023

(54) ENCODING DEVICE, DECODING DEVICE, AND TRANSMISSION DEVICE

(71) Applicant: FUJITSU LIMITED, Kawasaki (JP)

(72) Inventor: Yohei Koganei, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 11 days.

(21) Appl. No.: 17/370,002

(22) Filed: Jul. 8, 2021

(65) Prior Publication Data

US 2022/0077937 A1    Mar. 10, 2022

(30) Foreign Application Priority Data

Sep. 8, 2020 (JP) .............................. JP2020-150376

(51) Int. Cl.
| | |
|---|---|
| H03K 7/06 | (2006.01) |
| H03K 9/06 | (2006.01) |
| H04B 10/516 | (2013.01) |
| H04L 1/00 | (2006.01) |
| H04L 27/00 | (2006.01) |

(52) U.S. Cl.
CPC ....... H04B 10/5161 (2013.01); H04L 1/0043 (2013.01); H04L 27/00 (2013.01)

(58) Field of Classification Search
CPC . H04B 10/5161; H04B 10/516; H04L 1/0043; H04L 27/00; H04L 1/0042; G06N 7/005
USPC ...................................................... 375/271
See application file for complete search history.

(56) References Cited

U.S. PATENT DOCUMENTS

| | | | |
|---|---|---|---|
| 10,516,503 B1 | 12/2019 | Millar et al. | |
| 10,523,480 B1 * | 12/2019 | Gultekin | H04L 1/0042 |
| 10,530,490 B1 | 1/2020 | Vassilieva et al. | |
| 10,707,807 B2 * | 7/2020 | Jacques | H02S 30/10 |
| 10,749,554 B1 * | 8/2020 | Millar | H04B 1/10 |

FOREIGN PATENT DOCUMENTS

| | | |
|---|---|---|
| EP | 3588883 A1 | 1/2020 |
| WO | 2018/167920 A1 | 9/2018 |

OTHER PUBLICATIONS

Patrick Schulte et al., "Constant Composition Distribution Matching", IEEE Transaction on Information Theory, vol. 62, No. 1, pp. 430-434, Jan. 2016 (Total 5 pages).

(Continued)

*Primary Examiner* — Tanmay K Shah
(74) *Attorney, Agent, or Firm* — Fujitsu Patent Center

(57) ABSTRACT

An encoding device includes a processor. The processor configured to determine, based on an integer value that corresponds to a bit string of a predetermined amount, quantities for a predetermined number of individual symbol values included in a symbol sting encoded from the bit string of the predetermined amount. The processor configured to specify positions of symbols in the symbol string for the individual symbol values from the quantities for the individual symbol values and a first parameter related to a number of arrangement patterns of the symbols that corresponds to the quantities for the individual symbol values. The processor configured to generate the symbol string by assigning to the specified positions the corresponding symbol values.

9 Claims, 13 Drawing Sheets

(56) References Cited

OTHER PUBLICATIONS

Yohei Koganei et al., "Optimum Bit-Level Distribution Matching with at most O(N3) Implementation Complexity", in Proc. Opt. Fiber Conference, San Diego, CA, USA, Mar. 2019, OFC 2019, OSA 2019, Doc: M4B.4 (Total 3 pages).
Abdelkerim Amari et al., "Introducing Enumerative Sphere Shaping for Optical Communication Systems With Short Blocklengths", Journal of Lightwave Technology, vol. 37, No. 23, pp. 5926-5936, Dec. 1, 2019 (Total 11 pages).

* cited by examiner

FIG. 7
POSITION DETERMINATION OF SYMBOL C
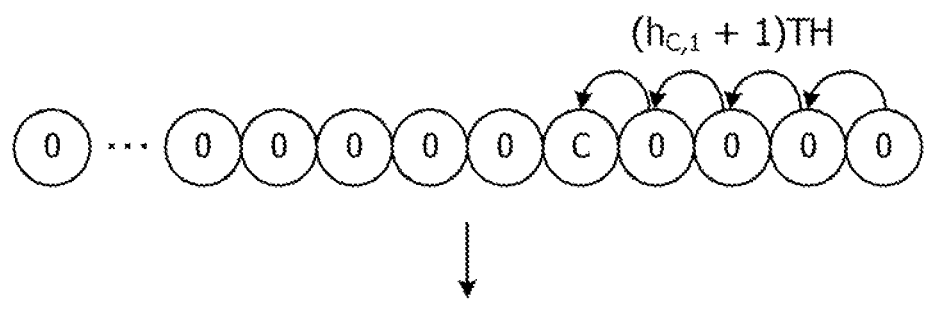
POSITION DETERMINATION OF SYMBOL (C - 1)
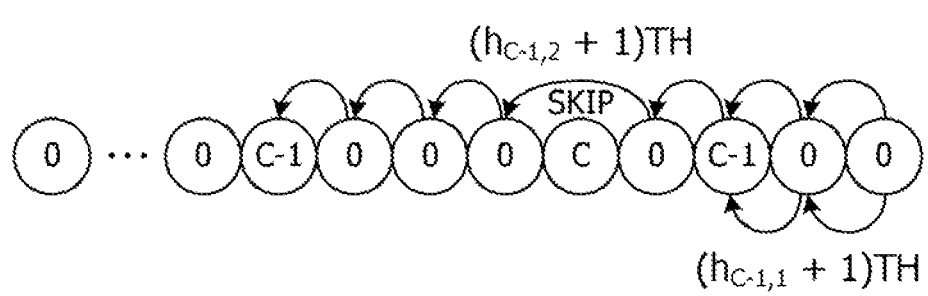

FIG. 9

| T | $K_0^{(T)}$ | $K_1^{(T)}$ | $K_2^{(T)}$ | E | $\binom{N}{K^{(T)}}$ | $\Sigma(N\ K)$ | $B_1^{(T)}$ | $B_2^{(T)}$ |
|---|---|---|---|---|---|---|---|---|
| 0 | 4 | 0 | 0 | 0.00 | 1 | 1 | 1 | 1 |
| 1 | 3 | 1 | 0 | 0.25 | 4 | 5 | 4 | 1 |
| 2 | 2 | 2 | 0 | 0.50 | 6 | 11 | 6 | 1 |
| 3 | 1 | 3 | 0 | 0.75 | 4 | 15 | 4 | 1 |
| 4 | 0 | 4 | 0 | 1.00 | 1 | 16 | 1 | 1 |
| 5 | 3 | 0 | 1 | 1.00 | 4 | 20 | 1 | 4 |

| BIT STRING | U | $U^{(T)}$ | $v_1$ | $v_2$ | $h_1^{(T)}$ | $h_2^{(T)}$ | SYMBOL STRING |
|---|---|---|---|---|---|---|---|
| 000000 | 0 | 0 | 0 | 0 | - | - | 0000 |
| 000001 | 1 | 0 | 0 | 0 | 0 | - | 0001 |
| 000010 | 2 | 1 | 1 | 0 | 1 | - | 0010 |
| 000011 | 3 | 2 | 2 | 0 | 2 | - | 0100 |
| 000100 | 4 | 3 | 3 | 0 | 3 | - | 0100 |
| 000101 | 5 | 0 | 0 | 0 | 1,0 | - | 0100 |
| 000110 | 6 | 1 | 1 | 0 | 2,0 | - | 0101 |
| 000111 | 7 | 2 | 2 | 0 | 2,1 | - | 0110 |
| 001000 | 8 | 3 | 3 | 0 | 3,0 | - | 1001 |
| 001001 | 9 | 4 | 4 | 0 | 3,1 | - | 1010 |
| 001010 | 10 | 5 | 5 | 0 | 3,2 | - | 1100 |
| 001011 | 11 | 0 | 0 | 0 | 2,1,0 | - | 1100 |
| 001100 | 12 | 1 | 1 | 0 | 3,1,0 | - | 1011 |
| 001101 | 13 | 2 | 2 | 0 | 3,2,0 | - | 1101 |
| 001110 | 14 | 3 | 3 | 0 | 3,2,1 | - | 1110 |
| 001111 | 15 | 0 | 0 | 0 | 4,3,2,1 | - | 1111 |
| 010000 | 16 | 0 | 0 | 0 | - | 0 | 0002 |
| 010001 | 17 | 1 | 0 | 1 | - | 1 | 0020 |
| 010010 | 18 | 2 | 0 | 2 | - | 2 | 0200 |
| 010011 | 19 | 3 | 0 | 3 | - | 3 | 2000 |

FIG. 10

Table G3:

| T | $K_0^{(T)}$ | $K_1^{(T)}$ | $K_2^{(T)}$ | E | $\binom{N}{K^{(T)}}$ | $\Sigma(N\ K)$ | $B_1^{(T)}$ | $B_2^{(T)}$ |
|---|---|---|---|---|---|---|---|---|
| 6 | 2 | 1 | 1 | 1.25 | 12 | 32 | 3 | 4 |
| 7 | 1 | 2 | 1 | 1.50 | 12 | 44 | 3 | 4 |
| 8 | 0 | 3 | 1 | 1.75 | 4 | 48 | 1 | 4 |
| 9 | 2 | 0 | 2 | 2.00 | 6 | 54 | 1 | 6 |
| 10 | 1 | 1 | 2 | 2.25 | 12 | 66 | 2 | 6 |
| 11 | 0 | 2 | 2 | 2.50 | 6 | 72 | 1 | 6 |
| 12 | 1 | 0 | 3 | 3.00 | 4 | 76 | 1 | 4 |
| 13 | 0 | 1 | 3 | 3.25 | 4 | 80 | 1 | 4 |
| 14 | 0 | 0 | 4 | 4.00 | 1 | 81 | 1 | 1 |
| Ave. | 1.6 | 1.4 | 1.0 | 1.38 | | | | |

Table G4:

| BIT STRING | U | $U^{(T)}$ | $v_1$ | $v_2$ | $h_1^{(T)}$ | $h_2^{(T)}$ | SYMBOL STRING |
|---|---|---|---|---|---|---|---|
| 010100 | 20 | 0 | 0 | 0 | 0 | 0 | 0012 |
| 010101 | 21 | 1 | 1 | 0 | 1 | 0 | 0102 |
| 010110 | 22 | 2 | 2 | 0 | 2 | 0 | 1002 |
| 010111 | 23 | 3 | 0 | 1 | 0 | 1 | 0021 |
| 011000 | 24 | 4 | 1 | 1 | 1 | 1 | 0120 |
| 011001 | 25 | 5 | 2 | 1 | 2 | 1 | 1020 |
| 011010 | 26 | 6 | 0 | 2 | 0 | 2 | 0201 |
| 011011 | 27 | 7 | 1 | 2 | 1 | 2 | 0210 |
| 011100 | 28 | 8 | 2 | 2 | 2 | 2 | 1200 |
| 011101 | 29 | 9 | 0 | 3 | 0 | 3 | 2001 |
| 011110 | 30 | 10 | 1 | 3 | 1 | 3 | 2010 |
| 011111 | 31 | 11 | 2 | 3 | 2 | 3 | 2100 |
| 100000 | 32 | 0 | 0 | 0 | 1,0 | 0 | 0112 |
| (OMITTED) | | | | | | | |
| 111111 | 63 | 9 | 1 | 4 | 1 | 3,1 | 2120 |

ENCODING DEVICE, DECODING DEVICE, AND TRANSMISSION DEVICE

CROSS-REFERENCE TO RELATED APPLICATION

This application is based upon and claims the benefit of priority of the prior Japanese Patent Application No. 2020-150376, filed on Sep. 8, 2020, the entire contents of which are incorporated herein by reference.

FIELD

The embodiment discussed herein is related to an encoding device, a decoding device, and a transmission device.

BACKGROUND

With an increase in transmission capacity of optical transmission devices, for example, multilevel modulation methods such as quadrature phase-shift keying (QPSK), 16 quadrature amplitude modulation (QAM), and 64 QAM are used. In the multilevel modulation methods, among symbols arranged in a constellation, symbols corresponding to values of individual bit strings in a frame to be modulated are assigned to the bit strings, thus an optical signal with a phase and an intensity based on the symbols is generated.

Probabilistic shaping (PS) is a technique that forms a probability distribution of symbol assignment by encoding values of bit strings so that, as the distance from the center of the constellation reduces, the likelihood of assignment of the symbol increases. Thus, power of the optical signal is reduced, and the noise immunity of the optical signal is improved.

The encoding process of the bit string is referred to as distribution matching (DM). For example, the DM is executed at a previous stage of the encoding process of forward error correction (FEC) on the optical signal transmission side. On the optical signal reception side, for example, at a subsequent stage of a decoding process of the FEC, inverse-DM that decodes into a bit string inversely to the DM is executed.

In the DM, conversion is performed such that the bit strings on the input side correspond to the symbol strings on the output side in a one-to-one relationship on a predetermined-data-amount-by-predetermined-data-amount basis. As means for realizing the DM, various methods have been proposed as follows.

(Method Using Look-Up Table)

The bit strings on the input side and the symbol strings on the output side are registered in a look-up table so as to correspond to each other in a one-to-one relationship. In the DM, values of the symbol strings corresponding to values of the bit strings are output from the look-up table. Since the size of the look-up table is exponentially proportional to the data amount of the bit strings, it is difficult to reduce search time for the look-up table.

(Method Using Arithmetic Coding)

A method using arithmetic coding is a method of determining the value of a symbol string by assigning the value of the symbol string to a plurality of sections provided on a number line and selecting a section corresponding to the value of a bit string. For example, a method called constant composition distribution matching (CCDM) is disclosed as one of these methods. In the CCDM, the numbers of symbols included in a symbol string are fixed on a value-by-value basis.

(Bit-by-Bit Processing Method)

A method of individually performing the DM for each bit level of multilevel modulation is disclosed. With the algorithm of this method, a low-loss conversion rate may be achieved even when the size of the symbol string is small.

(Symbol-by-Symbol Processing Method)

A method called enumerative sphere shaping (ESS) by which the DM is performed on a symbol-by-symbol basis is disclosed. With the ESS, a conversion rate with a lower loss than that of the CCDM may be achieved when the size of the symbol string is small.

U.S. patent Ser. No. 10/516,503 is disclosed as related art.

P. Schulte, et al. "Constant Composition Distribution Matching", IEEE Trans. Inf. Theory, vol. 62, no. 1, pp. 430-434, 2016, Y. Koganei, et al. "Optimum Bit-level Distribution Matching with at most O (N3) Implementation Complexity", in Proc. Opt. Fiber. Conf. San Diego, Calif., USA, March 2019, Paper M4B.4, and A. Amari, et al. "Introducing Enumerative Sphere Shaping for Optical Communication Systems With Short Block lengths", IEEE J. Lightwave Technol. vol. 37, no. 23, pp. 5926-5936, 2019 are also disclosed as related art.

SUMMARY

According to an aspect of the embodiments, an encoding device includes: a memory; and a processor coupled to the memory and configured to: determine, based on an integer value that corresponds to a bit string of a predetermined amount, quantities for a predetermined number of individual symbol values included in a symbol string encoded from the bit string of the predetermined amount, specify positions of symbols in the symbol string for the individual symbol values from the quantities for the individual symbol values and a first parameter related to a number of arrangement patterns of the symbols that corresponds to the quantities for the individual symbol values, and generate the symbol string by assigning to the specified positions the corresponding symbol values.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an example of symbol position determination;

FIG. 9 is a diagram (No. 1) illustrating an example of encoding of a bit string into a symbol string;

FIG. 10 is a diagram (No. 2) illustrating the example of encoding of the bit string into the symbol string;

DESCRIPTION OF EMBODIMENTS

For example, as a circuit configuration for executing the ESS, it is conceived to use a plurality of circuit blocks according to a method disclosed in "Optimum Bit-level Distribution Matching with at most O (N3) Implementation Complexity". In this case, the loss of the conversion rate from the bit string to the symbol string increases due to a distribution of the bit string on the input side to each circuit block.

For example, when a predetermined amount of bit string is divided into pieces of data of one or more bits and the divided pieces of data are input to the circuit blocks of the DM of individual bit levels, the granularity of bit data input to each circuit block is the power of 2. Accordingly, to convert each piece of the bit data on the input side and the output side by the DM in a one-to-one relationship, an excessively large number of patterns of the symbol data on the output side are desired for the number of patterns of the bit data on the input side for each of the circuit blocks.

However, there is a possibility of deterioration of the performance of the PS at last caused by an increase in the loss of the entire conversion rate due to the difference in the number of patterns between the input side and the output side.

Accordingly, an object of the present embodiment is to provide an encoding device, a decoding device, and a transmission device that are able to improve the performance of the probabilistic shaping.

Effects of Invention (Configuration of Transmission System)

Figure 1:
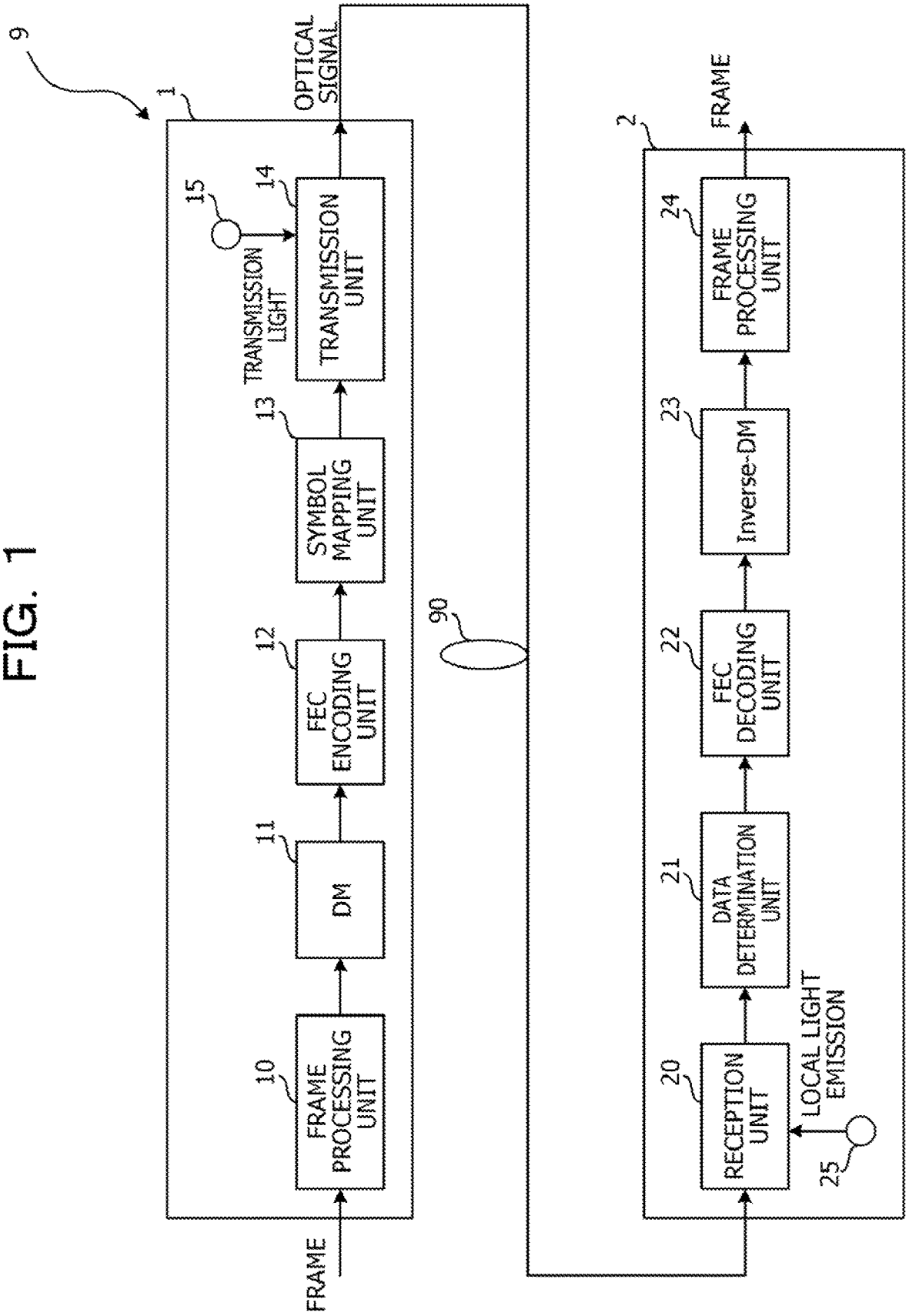
FIG. 1 is a configuration diagram illustrating an example of a transmission system.

FIG. 1 is a configuration diagram illustrating an example of a transmission system 9. The transmission system 9 includes a transmission apparatus 1 and a reception apparatus 2 coupled to each other through a transmission path 90 such as an optical fiber. The transmission apparatus 1 transmits an optical signal to the reception apparatus 2 through the transmission path 90, and the reception apparatus 2 receives the optical signal from the transmission apparatus 1. The transmission apparatus 1 and the reception apparatus 2 are examples of a transmission device.

The transmission apparatus 1 includes a frame processing unit 10, distribution matching (DM) 11, a forward error correction (FEC) encoding unit 12, a symbol mapping unit 13, a transmission unit 14, and a transmission light source 15. The frame processing unit 10 extracts data from a frame input from a network on the client side and outputs the data to the DM.

The DM 11 converts the data into a symbol string for individual bit strings of a predetermined number of bits. The symbol string includes a predetermined number of symbols. There are a plurality of different types of symbols assigned with different values as indexes. In the following description, the value of the index of each symbol is referred to as a "symbol value". The DM11 outputs the symbol string to the FEC encoding unit 12.

The FEC encoding unit 12 performs FEC decoding on the data in the symbol string and outputs the data to the symbol mapping unit 13. The symbol mapping unit 13 performs a mapping process for the individual symbols in the symbol string in accordance with a multilevel modulation method and outputs the result to the transmission unit 14. The transmission light source 15 is an example of a light source and outputs transmission light to the transmission unit 14.

The transmission unit 14 optically modulates the transmission light based on the symbol string to generate and transmit an optical signal. The transmission unit 14 includes such as, for example, an optical modulator. The transmission unit 14 optically modulates the transmission light by using an optical modulator in accordance with the symbol. Thus, the optical signal is generated and output to the transmission path 90. The optical signal is input to the reception apparatus 2 from the transmission path 90.

The reception apparatus 2 includes a reception unit 20, a data determination unit 21, an FEC decoding unit 22, inverse-DM23, a frame processing unit 24, and a local light emission source 25. The optical signal is input to the reception unit 20 from the transmission path 90. The local light emission source 25 outputs local light emission to the reception unit 20.

The reception unit 20 receives the optical signal including the symbol string from the transmission apparatus 1. The reception unit 20 includes such as, for example, an optical coupler and a photodiode. The reception unit 20 detects the optical signal by using the local light emission and converts the optical signal into an electric signal by using the photodiode. The electric signal is output from the reception unit 20 to the data determination unit 21.

The data determination unit 21 performs soft decision and hard decision on the data of the electric signal. A determination value of the data is output from the data determination unit 21 to the FEC decoding unit 22. The FEC decoding unit 22 performs FEC decoding on the data based on the determination value and outputs to the inverse-DM23.

The inverse-DM23 converts the data into a bit string of a predetermined number of bits for the individual symbol strings. Each symbol string includes a predetermined number of symbols. For example, the inverse-DM23 performs conversion inverse to the conversion performed by the DM11 on the data. The converted data is output from the inverse-DM23 to the frame processing unit 24.

The frame processing unit 24 restores the frame by performing a data demodulation process in accordance with the multilevel modulation method of the symbol mapping unit 13. The frame is transmitted from the reception apparatus 2 to a network on the other client side.

(Probabilistic Shaping)

Figure 2:
FIG. 2 is a diagram illustrating an example of a process of probabilistic shaping.

FIG. 2 is a diagram illustrating an example of a probabilistic shaping (PS) process. In this example, a 16 quadrature amplitude modulation (16-QAM) constellation is illustrated for convenience of explanation. In the constellation, symbols P11 to P14, P21 to P24, P31 to P34, and P41 to P44, which are signal points, are arranged evenly in the first to fourth quadrants.

The sizes of circles of the symbols P11 to P14, P21 to P24, P31 to P34, and P41 to P44 respectively indicate the values of the probability allocated to the symbols. The probability allocated to the symbols before the PS is equal among the symbols P11 to P14, P21 to P24, P31 to P34, and P41 to P44.

The probability allocated to the symbols after the PS becomes higher as the distance between a center point O and the symbols P11 to P14, P21 to P24, P31 to P34, and P41 to P44 reduces. For example, the probability allocated to the symbols P22, P23, P32, and P33 the distance of which from the center point O is smallest is maximum, and the probability allocated to the symbols P11, P14, P41, and P44 the distance of which from the center point O is greatest is minimum.

The DM11 converts the bit string into the symbol string so as to increase the probability allocated to the symbols P22, P23, P32, and P33 close to the center point O. For example, the DM11 defines the distance from the center point O with the symbol value. The quadrants of the symbols P11 to P14, P21 to P24, P31 to P34, and P41 to P44 are determined by, for example, the symbol mapping unit 13 in accordance with bit values of specific levels in the bit string.

(Configuration of DM)

Figure 3:
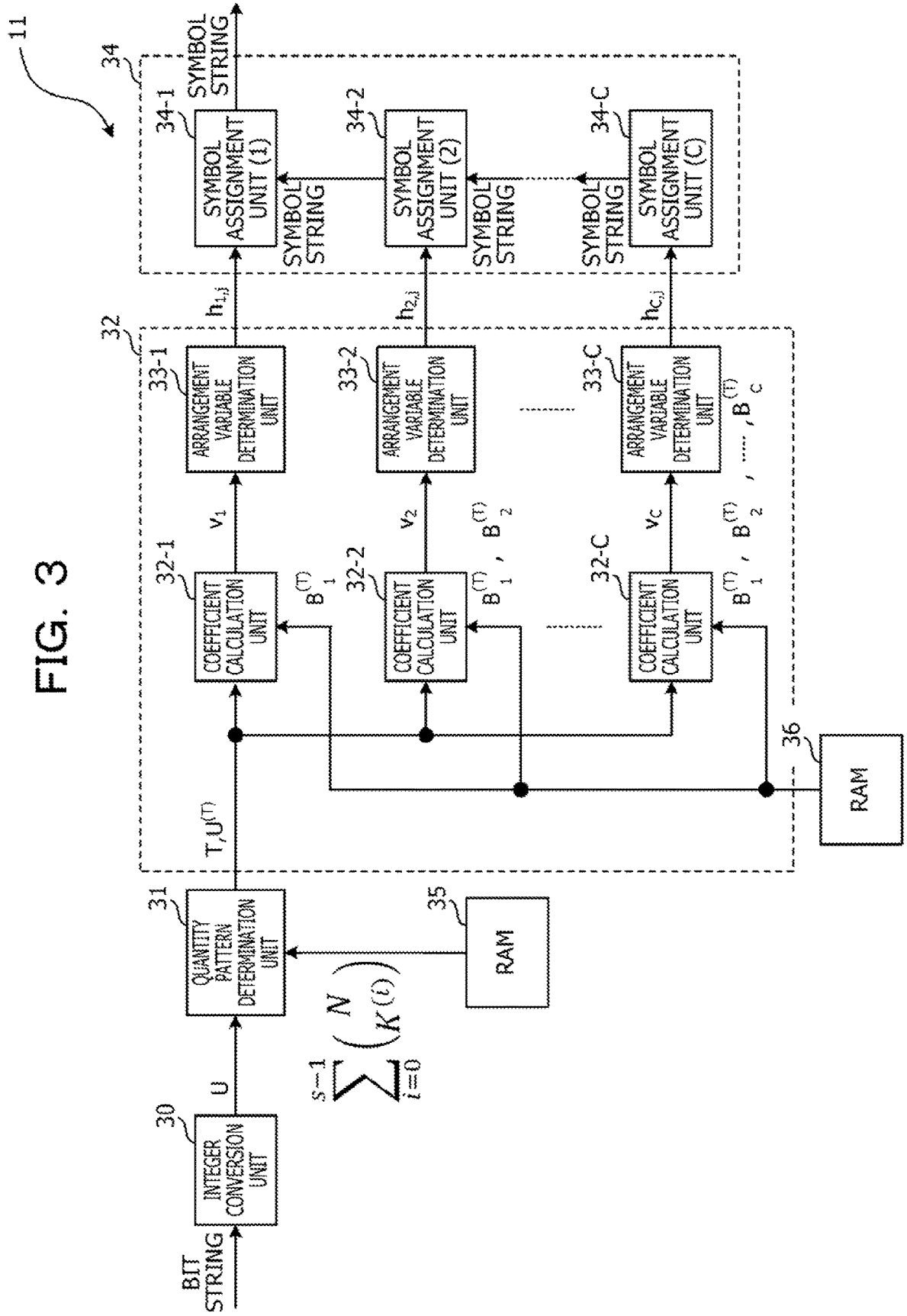
FIG. 3 is a configuration diagram illustrating an example of distribution matching (DM)

FIG. 3 is a configuration diagram illustrating an example of the DM 11. The DM 11 encodes a bit string of M bits (M is a positive integer) into a symbol string of a number of the symbols of N. The DM 11 is an example of an encoding device.

The DM 11 includes an integer conversion unit 30, a quantity pattern determination unit 31, a symbol arrangement calculation unit 32, a symbol generation unit 34, and random-access memories (RAM) 35 and 36. The DM11 includes hardware that includes at least a subset of, for example, a central processing unit (CPU), a memory, a field-programmable gate array (FPGA), an application-specified integrated circuit (ASIC), and so forth.

The bit string is input to the integer conversion unit 30. The integer conversion unit 30 converts the bit string into an unsigned integer value U and outputs the unsigned integer value U to the quantity pattern determination unit 31.

The quantity pattern determination unit 31 is an example of a determination unit and determines the quantity of symbols for each symbol value in the bit string based on the integer value U. When the symbol values in the symbol string are 0, 1, 2, . . . , C (a positive integer), there are $(C+1)^N$ symbol arrangement patterns in the symbol string. For example, when C=2 and N=4, there are 81 ($=3^4$) symbol arrangement patterns in the symbol string. Meanwhile, the number of bit patterns of the bit string on the input side is $2^M$.

It is assumed that the quantities of symbols for the symbol values 0, 1, 2, . . . , C in the symbol string are $K_0, K_1, K_2, \ldots, K_C$, respectively. The total of the numbers of the symbols $K_0, K_1, K_2, \ldots, K_C$ is equal to the total number N of the symbols of the symbol string. For example, when C=2, the quantity pattern determination unit 31 determines the number of symbols $K_0$ for the symbol value 0, the number of symbols $K_1$ for the symbol value 1, and the number of symbols $K_2$ for the symbol value 2. The number of symbols $K_0, K_1, K_2, \ldots, K_C$ are expressed as a vector K.

[Expression 1]

$$\binom{N}{K} = \frac{N!}{K_0! K_1! K_2! \ldots K_C!} \quad (1)$$

The number of arrangement patterns of the symbols in the symbol string is calculated by expression (1) described above. The left side of expression (1) is expressed as a binomial coefficient. In the following description, the binomial coefficient indicating the number of arrangement patterns is expressed as a variable symbol arranged side by side ("(N·K)" in the case of expression (1)).

The quantity pattern determination unit 31 determines a variable T that identifies a pattern of combinations of the quantities for each of the symbol values in the symbol string (hereinafter, referred to as a "quantity pattern"). The symbol arrangement calculation unit 32 calculates the positions of the symbols for each of the symbol values in the symbol string in accordance with the variable T. For example, the symbol arrangement calculation unit 32 determines an arrangement pattern of the symbols. The symbol arrangement calculation unit 32 is an example of a first calculation unit.

Figure 4:
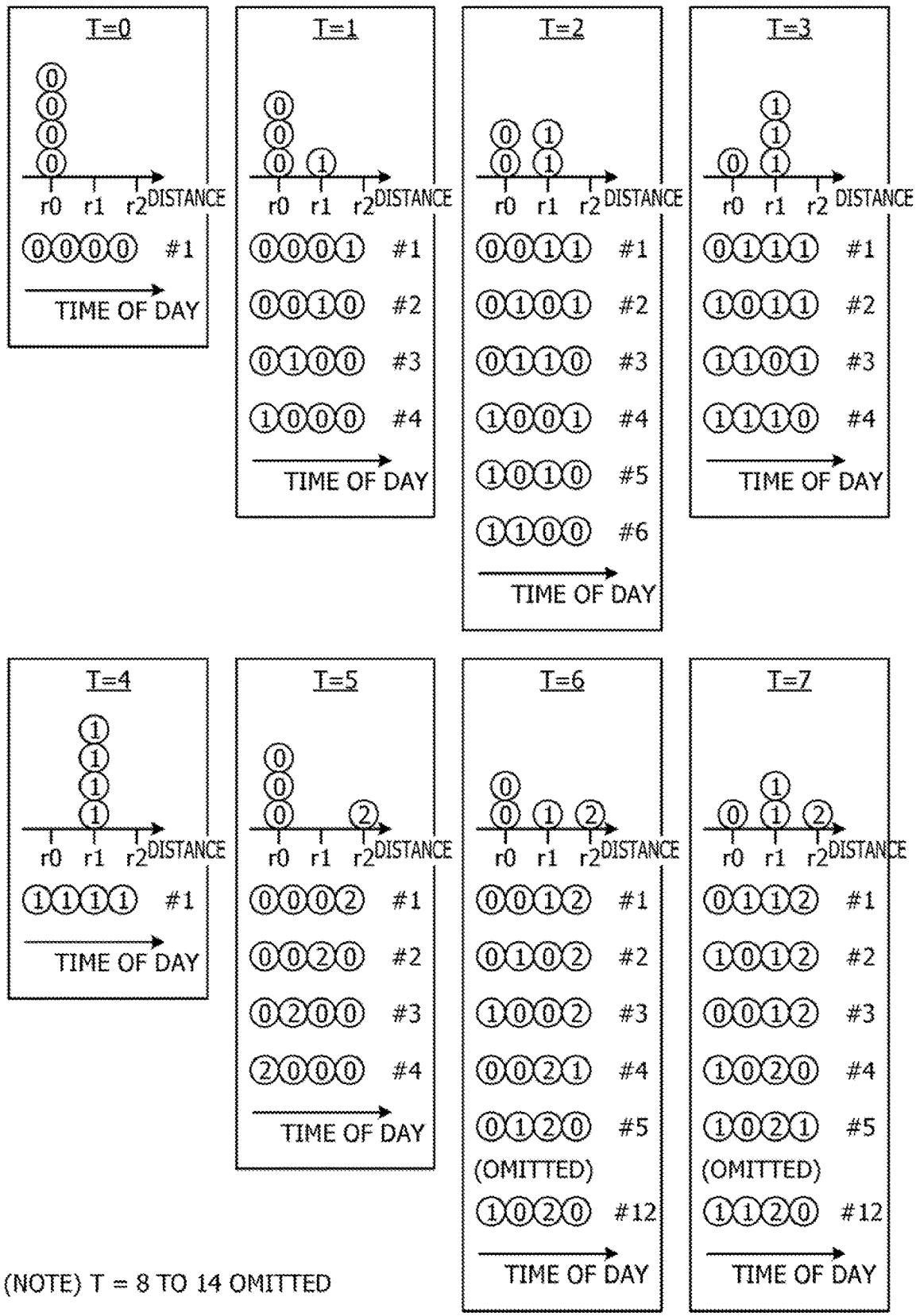
FIG. 4 is a diagram illustrating examples of arrangement patterns of the symbols on a quantity-pattern-by-quantity-pattern basis.

FIG. 4 is a diagram illustrating examples of arrangement patterns of the symbols on for individual quantity patterns. In these examples, N=4 and C=2. FIG. 4 illustrates the quantity patterns and the arrangement patterns of the symbols when the variable T=0, 1, 2, . . . , 7. Illustration of the quantity patterns and the arrangement patterns of the variables T=8 to 14 is omitted.

For example, a symbol value 0 corresponds to the symbols separated by a distance $r_0$ from the origin in the constellation, a symbol value 1 corresponds to the symbols separated by a distance $r_1$ from the origin in the constellation, and a symbol value 2 corresponds to the symbols separated by a distance $r_2$ from the origin in the constellation. For example, in the case of T=0, the number of symbols of the symbol value 0 is four, and the numbers of symbols of the symbol values 1 and 2 are zero. When T=7, the numbers of symbols of the symbol values 0 and 2 are one, and the number of symbols of the symbol value 1 is two.

[Expression 2]

$$E = \sum_{i=0}^{C} K_i r_i^2 / N \quad (2)$$

The variable T is determined based on the power of the optical signal of each bit string calculated from the quantity pattern of the bit string. An average power E of a single symbol of the optical signal is calculated, for example, from the number of symbols $K_i$ and the distance $r_i$ (i=0 to C) in accordance with expression (2) described above. The variable T is defined in accordance with the order of the average powers E. For example, the variable T=0 corresponds to the quantity pattern in the case where the average power E is the lowest, and T=14 corresponds to the quantity pattern in the case where the average power E is the highest. With this method, a best-effort probability distribution is realized for the value of M independently of the value of M. The best-effort probability distribution means a distribution in which the positions of the symbols are biased as much as possible toward the center as an average.

There are 1 or more arrangement patterns in each of the quantity patterns of T=1 to 14. Arrangement patterns #m (m: a positive integer) are indicated for the individual variables T as turns in the transmission order of the symbols 0 to 2 with respect to times of day.

For example, in the case of T=0, since the quantity pattern includes four symbols of the symbol value of 0, only the arrangement pattern #1 exists. In the case of T=1, since the quantity pattern includes three symbols of the symbol value of 0 and one symbol of the symbol value of 1, arrangement patterns #1 to #4 exist. When K corresponding to the variable T is $K^{(T)}$, the number of the arrangement patterns (N·K$^{(T)}$) for each variable T is calculated from expression (1) described above. For example, (N·K$^{(0)}$) is 1, and (N·K$^{(2)}$) is 4.

Figure 5:
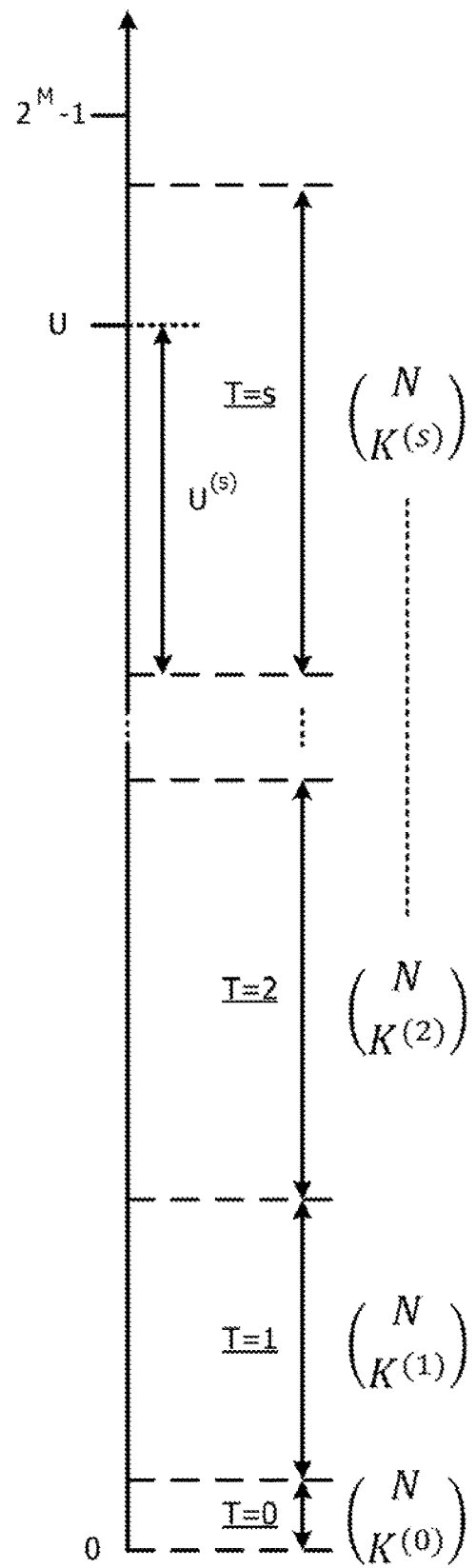
FIG. 5 is a diagram illustrating an example of a method of determining the quantity pattern of the symbols.

FIG. 5 is a diagram illustrating an example of a method of determining the quantity pattern of the symbols. The quantity pattern determination unit 31 searches for a variable T corresponding to the position on a number line of the integer value U (=0 to $2^{M}-1$) corresponding to the bit string. The quantity pattern determination unit 31 searches for the variable T=s in a section where the integer value U exists on the assumption that the number line is divided into sections having lengths corresponding to the numbers of the arrangement patterns for the respective variables T (N·K$^{(T)}$). The sections are arranged in ascending order of the variable T from 0 toward $2^{M-1}$ on the number line.

[Expression 3]

$$U = \sum_{i=0}^{M-1} u_i 2^i \quad (3)$$

The integer value U is calculated from M bit values $u_i$ (i=0, 1, . . . , M−1) of the bit string based on expression (3) described above.

[Expression 4]

$$U^{(S)} = U - \sum_{i=0}^{s-1} \binom{N}{K^{(i)}} \quad (4)$$

[Expression 5]

$$U^{(T)} \geq 0 \quad (5)$$

[Expression 6]

$$U^{(T+1)} < 0 \quad (6)$$

The quantity pattern determination unit 31 sequentially calculates a difference $U^{(s)}$ between the integer value U and the total of the numbers of arrangement patterns (N·K$^{(i)}$) in the case where a variable s=0, 1, 2, . . . in accordance with expression (4) described above. The quantity pattern determination unit 31 searches for the variable s that satisfies the conditions of expressions (5) and (6) and sets the variable T=s. For example, the quantity pattern determination unit 31 determines the variable T within a range in which the integer value U does not exceed the total of the numbers (N·K$^{(s)}$) of the arrangement patterns for the variables s=0, 1, 2, . . . .

[Expression 7]

$$U^{(T)} < \binom{N}{K^{(T)}} \quad (7)$$

Thus, expression (7) described above is established. For example, in the case where U=6, N=4, and C=2, the numbers of arrangement patterns for the variables s=0, 1, and 2 (N·K$^{(0)}$), (N·K$^{(1)}$), and (N·K$^{(1)}$) are 1, 4, and 6, respectively. In this case, since (N·K$^{(0)}$)+(N·K$^{(1)}$) (=5)<U<(N·K$^{(0)}$)+ (N·K$^{(1)}$)+(N·K$^{(2)}$) (=11) is established, the quantity pattern determination unit 31 sets the variable T=1. At this time, $U^{(1)}(=1)<(N·K^{(2)})$ is established.

In this way, the quantity pattern determination unit 31 determines the number of the arrangement patterns of the symbols (N·K$^{(s)}$) obtained from a plurality of the quantity patterns and the quantity pattern (variable T) from the comparison result of the integer value U. Thus, the quantity pattern determination unit 31 may efficiently select the quantity pattern based on the distribution of the number of arrangement patterns existing for each of the quantity patterns.

Referring again to FIG. 3, the RAM 35 stores the numbers (N·K$^{(T)}$) of arrangement patterns calculated in advance for the individual variables T. The quantity pattern determination unit 31 obtains the number (N·K$^{(T)}$) of arrangement patterns from the RAM 35. For example, the quantity pattern determination unit 31 obtains the value of the second term on the right side of expression (4) from the RAM 35. Accordingly, the quantity pattern determination unit 31 may omit the work of calculating the number of arrangement patterns (N·K$^{(T)}$). The RAM 35 is an example of a second storage unit.

The quantity pattern determination unit 31 outputs the variable T and the difference $U^{(T)}$ to the symbol arrangement calculation unit 32. The symbol arrangement calculation unit 32 includes arrangement variable determination units 33-1, 33-2, . . . , 33-C and coefficient calculation units 32-1, 32-2, . . . , 32-C respectively corresponding to the symbol values 1, 2, . . . , C except for the symbol value 0. The symbol arrangement calculation unit 32 also includes the RAM 36.

The symbol arrangement calculation unit 32 determines, from the difference $U^{(T)}$, the variable T determined by the quantity pattern determination unit 31 and the arrangement patterns corresponding to the position of the integer value U in the section of the variable T on the number line illustrated in FIG. 5. The difference $U^{(T)}$ is an example of a first parameter related to the arrangement patterns of the symbols in accordance with the quantity (variable T) for each symbol value determined by the quantity pattern determination unit 31.

[Expression 8]

$$\binom{N}{K} = \binom{K_0+K_1}{K_1}\binom{K_0+K_1+K_1}{K_2} \cdots \binom{N}{K_C} = \prod_{i=1}^{C}\binom{\sum_{j=0}^{i} K_j}{K_i} \quad (8)$$

[Expression 9]

$$B_i^{(T)} = \binom{\sum_{j=0}^{i} K_j^{(T)}}{K_i^{(T)}} \quad (9)$$

[Expression 10]

$$\binom{N}{K^{(T)}} = \prod_{i=1}^{C} B_i^{(T)} \quad (10)$$

The number of the arrangement patterns of the symbols (N·K) of expression (1) is able to be factorized as in expression (8) described above. When the parameter $B_j^{(T)}$ corresponding to the variable T is defined as represented by expression (9) described above, the number of the arrangement patterns of the symbols (N·K$^{(T)}$) corresponding to the variable T is represented by expression (10) described above.

[Expression 11]

$$U^{(T)} = v_1 + v_2 B_1^{(T)} + v_3 B_1^{(T)} B_2^{(T)} + \ldots + v_c \prod_{j=1}^{C} B_j^{(T)} \quad (11)$$

[Expression 12]

$$v_i = \left( U^{(T)} / \prod_{j=1}^{i-1} B_j^{(T)} \right) \% B_i^{(T)} \quad (12)$$

Then, the difference $U^{(T)}$ is expressed, from expression (10), by expression (11) described above. For example, the difference $U^{(T)}$ is expressed as a product-sum operation using coefficients $v_1, v_2, \ldots, v_C$ and the parameter $B_i^{(T)}$. The coefficients $v_1, v_2, \ldots, v_C$ are each calculated from the difference $U^{(T)}$ and the parameter $B_i^{(T)}$ based on expression (12) described above. In expression (12), "%" is an operator for calculating the remainder of division.

The coefficient calculation units 32-1, 32-2, . . . , 32-C respectively calculate the coefficients $v_1, v_2, \ldots, v_C$ in accordance with expression (12) and respectively output the coefficients to the arrangement variable determination units 33-1, 33-2, . . . , 33-C. The RAM 36 stores the parameter $B_i^{(T)}$ for each of the quantity patterns (variable Ts). The RAM 36 is an example of a first storage unit, and the parameter $B_i^{(T)}$ is an example of a second parameter related to the calculation of the difference $U^{(T)}$. The parameter $B_i^{(T)}$ is used to calculate the positions of the symbol values 1, 2, . . . , C in the symbol string.

The coefficient calculation units 32-1, 32-2, . . . , and 32-C obtain the parameter $B_i^{(T)}$ from the RAM 36 in accordance with the quantity patterns (variable T) determined by the quantity pattern determination unit 31. For example, the coefficient calculation unit 32-1 for the symbol value 1 obtains the parameter $B_1^{(T)}$, the coefficient calculation unit 32-2 for the symbol value 2 obtains the parameters $B_1^{(T)}$ and $B_2^{(T)}$, and the coefficient calculation unit 32-C for the symbol value C obtains the parameters $B_1^{(T)}, B_2^{(T)}, \ldots, B_C^{(T)}$. Thus, for the coefficient calculation units 32-1, 32-2, . . . , 32-C, the work of calculating the parameter $B_i^{(T)}$ may be omitted.

The arrangement variable determination units 33-1, 33-2, . . . , 33-C determine the positions of the symbol values 1, 2, . . . , C in the symbol string. The arrangement variable determination units 33-1, 33-2, . . . , 33-C respectively calculate variables $h_{1,j}, h_{2,j}, \ldots, h_{C,j}$ indicating the arrangement of the symbol values 1, 2, . . . , C from the coefficients $v_1, v_2, \ldots, v_C$.

[Expression 13]

$$v_i = \sum_{k=1}^{K_i^{(T)}} \binom{h_{i,k}}{k} \quad (3)$$

The variables $h_{1,j}, h_{2,j}, \ldots, h_{C,j}$ satisfy expression (13) described above. Here, i=1, 2, . . . , C and k=1, . . . , $K_i^{(T)}$.

Figure 6:
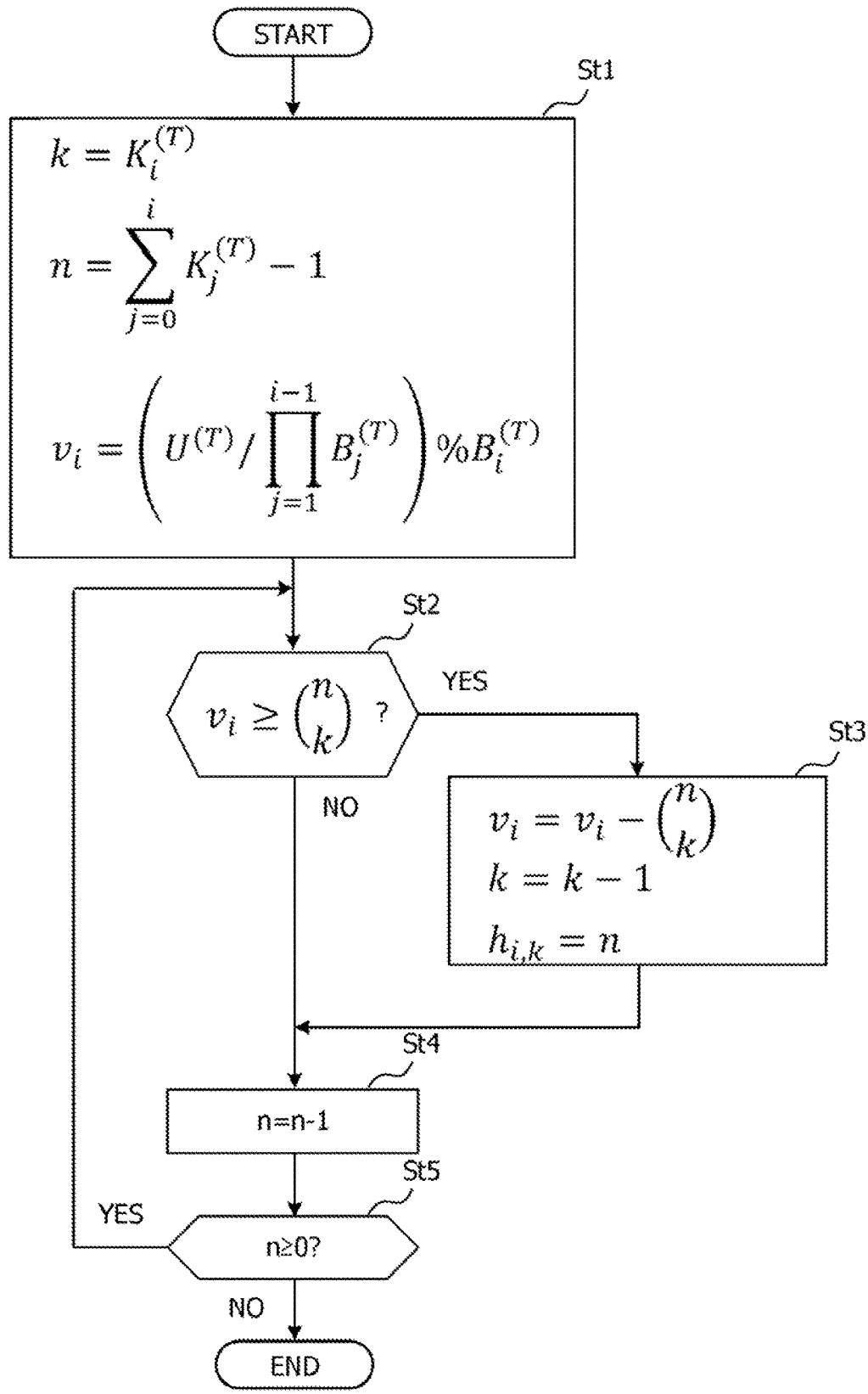
FIG. 6 is a flowchart illustrating an example of processing of calculating variables indicating arrangement of symbol values.

FIG. 6 is a flowchart illustrating an example of processing of calculating variables $h_{1,j}, h_{2,j}, \ldots, h_{C,j}$ indicating the arrangement of the symbol values 1, 2, . . . , C. This processing of calculation is executed for each of the coefficients $v_1, v_2, \ldots, v_C$.

[Expression 14]

$$k = K_i^{(T)} \quad (4)$$

[Expression 15]

$$n = \sum_{j=0}^{i} K_j^{(T)} - 1 \quad (5)$$

The arrangement variable determination units 33-1, 33-2, . . . , 33-C execute initial settings of variables k, n and the coefficient $v_i$ (step St1). The variable k is calculated by expression (14) described above, and the variable n is calculated by expression (15) described above. As the coefficient $v_i$, values calculated by the coefficient calculation units 32-1, 32-2, . . . , 32-C in accordance with expression (12) are used.

Next, the arrangement variable determination units 33-1, 33-2, . . . , 33-C compare the coefficient $v_i$ with the binomial coefficient (n·k) (step St2). When the coefficient $v_i$ is greater than or equal to the binomial coefficient (n·k) (Yes in step St2), the arrangement variable determination units 33-1, 33-2, . . . , 33-C subtract the binomial coefficient (n·k) from the coefficient $v_i$, subtract 1 from the variable k, and set the variable $h_{i,k}$ as the variable n (step St3). Next, the arrangement variable determination units 33-1, 33-2, . . . , 33-C subtract 1 from the variable n (step St4).

When the coefficient $v_i$ is smaller than the binomial coefficient (n·k) (No in step St2), the arrangement variable determination unit 33-1, 33-2, . . . , 33-C subtract 1 from the variable n (step St4) and do not execute the process of step St3.

Next, the arrangement variable determination units 33-1, 33-2, . . . , 33-C compare the variable n with 0 (step St5). When n≥0 (Yes in step St5), the processes in and after step St2 are executed again. When n<0 (No in step St5), the processing ends. In the case where the process of step St3 is not executed, when it is determined that n<0 (No in step St5), it is determined that there is no valid variable $h_{i,j}$.

In this way, the symbol arrangement calculation unit 32 calculates the positions of the symbols in the symbol string for each of the symbol values 1, 2, . . . , C from the integer value U and the parameter $B_i^{(T)}$.

Referring again to FIG. 3, the arrangement variable determination units 33-1, 33-2, . . . , 33-C output the variables $h_{1,j}, h_{2,j}, \ldots, h_{C,j}$ to a symbol generation unit 34. The symbol generation unit 34 generates the symbol string by assigning to the positions calculated by the symbol arrangement calculation unit 32 the corresponding symbol values.

The symbol generation unit 34 includes symbol assignment units 34-1, 34-2, . . . , 34-C that respectively assign symbol values 1, 2, . . . , C to the corresponding positions in the symbol string. The variables $h_{1,j}, h_{2,j}, \ldots, h_{C,j}$ are input to the symbol assignment units 34-1, 34-2, . . . , 34-C, respectively.

The symbol assignment units 34-1, 34-2, . . . , 34-C sequentially assign the symbol values 1, 2, . . . , C to the positions indicated by the variables $h_{1,j}, h_{2,j}, \ldots, h_{C,j}$, for the symbol string in which all the symbol values are 0 in the initial state. First, the symbol assignment unit 34-C assigns the symbol value C to the symbol string in which all the symbol values are 0 and outputs the symbol value C to a symbol assignment unit 34-(C−1). Next, the symbol assignment unit 34-(C−1) assigns a symbol value (C−1) to the symbol string to which the symbol value C has been assigned. In this way, the symbol values 1, 2, . . . , C are assigned to the symbol string in descending order, and at last the symbol assignment unit 34-1 assigns the symbol value 1 to the symbol string.

FIG. 7 is a diagram illustrating an example of symbol position determination. Although position determination by the symbol assignment units 34-C, 34-(C−1) is described as the example here, the other symbol assignment units 34-1, 34-2, . . . , 34-(C−2) also perform position determination by a method similar to this method.

The symbol assignment unit 34-C determines the position of the symbol value C in the bit string from the variable $h_{C,1}$. The symbol assignment unit 34-C assigns the symbol value C to an $(h_{C,1}+1)$th symbol from the lower side of the symbol string in which all the symbol values are 0. For example, the symbol assignment unit 34-C determines an $(h_{C,1}+1)$th position from the lower side of the symbol string as the position of the symbol value C. For example, when $h_{C,1}=3$, the position of the symbol value C is determined to be the fourth (=3+1) position from the lower side of the symbol string.

The symbol assignment unit 34-(C−1) determines the position of the symbol value (C−1) in the bit string from the variables $h_{C-1,1}$, $h_{C-1,2}$. The symbol assignment unit 34-(C−1) assigns the symbol value (C−1) to each of the symbols that are $(h_{C,1}+1)$th and $(h_{C,2}+1)$th, with the symbol value C skipped, from the lower side of the symbol string to which the symbol value C has been assigned. For example, the symbol assignment unit 34-(C−1) determines the $(h_{C,1}+1)$th and $(h_{C,2}+1)$th positions from the lower side of the symbol string as the positions of the symbol value (C−1). For example, when $h_{C-1,1}=1$ and $h_{C-1,2}=6$, the positions of the symbol value (C−1) are determined to be the second (=1+1) position from the lower side of the symbol string and the seventh (6+1) position, with the symbol value C skipped, from the lower side of the symbol string. Similar position determination is performed for the symbol value (C−2) and the subsequent symbol values. When there is no valid variable $h_{i,j}$, the symbol assignment units 34-1, 34-2, . . . , 34-C do not assign the symbols. In this case, the symbol assignment units 34-1, 34-2, . . . , 34-C output the symbol strings without changing the symbol strings.

Figure 8:
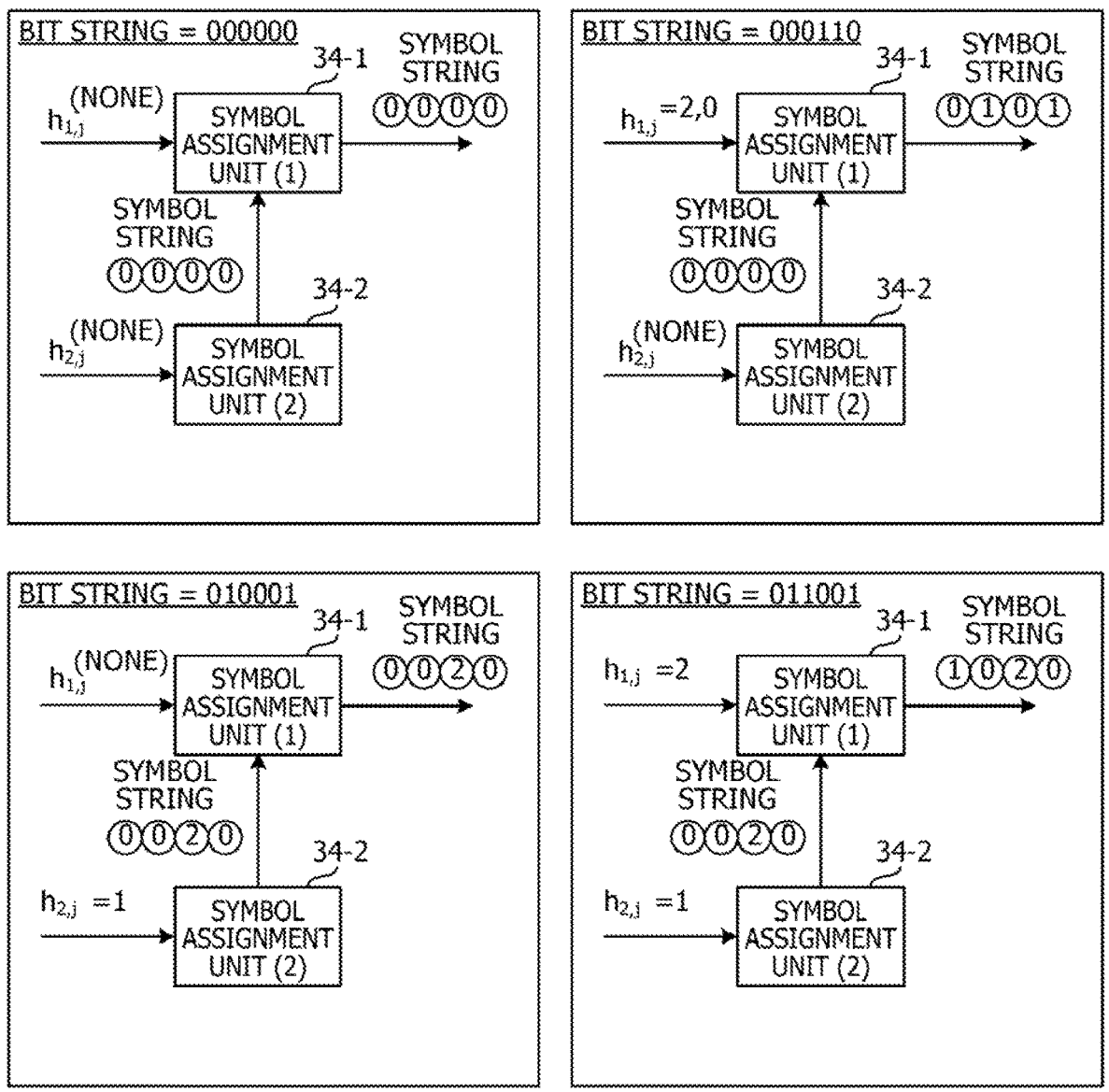
FIG. 8 is a diagram illustrating an example of generation of bit strings.

FIG. 8 is a diagram illustrating an example of generation of bit strings. Here, generation of a symbol string when the bit strings are "000000", "000110", "010001", and "011001" (in binary notation) is described as the example. In this example, the number of bits per bit string (M) is 6 bits, and the number of symbols per symbol string (N) is 4.

When the bit string is "000000", there is no valid variable $h_{1,j}$, $h_{2,j}$ (see "NONE"). Thus, the symbol assignment unit 34-1 outputs the symbol string "0000" to the symbol assignment unit 34-2 without changing the symbol string, and the symbol assignment unit 34-2 also outputs the symbol string "0000" without changing the symbol string. Thus, the bit string "000000" is encoded into the symbol string "0000".

When the bit string is "000110", the variable $h_{1,j}=2, 0$ and there is no valid variable $h_{2,j}$. Thus, since there is no valid variable $h_{2,j}$, the symbol assignment unit 34-2 outputs the symbol string "0000" to the symbol assignment unit 34-1 without changing the symbol string. The symbol assignment unit 34-1 assigns the symbol value 1 to the first and third symbols from the lower side of the symbol string "0000" based on the variable $h_{1,j}=2, 0$ so as to generate and output the symbol string "0101". Thus, the bit string "000110" is encoded into the symbol string "0101".

When the bit string is "010001", the variable $h_{2,j}=1$, and there is no valid variable $h_{1,j}$. Thus, the symbol assignment unit 34-2 assigns the symbol value 2 to the second symbol from the lower side of the symbol string "0000" based on the variable $h_{2,j}=1$ so as to generate the symbol string "0020" and output the symbol string "0020" to the symbol assignment unit 34-1. Since there is no valid variable $h_{1,j}$, the symbol assignment unit 34-1 outputs the symbol string "0020" without changing the symbol string. Thus, the bit string "010001" Is encoded into the symbol string "0020".

When the bit string is "011001", the variable $h_{1,j}=2$, and the variable $h_{2,j}=1$. Thus, the symbol assignment unit 34-2 assigns the symbol value 2 to the second symbol from the lower side of the symbol string "0000" based on the variable $h_{2,j}=1$ so as to generate the symbol string "0020" and output the symbol string "0020" to the symbol assignment unit 34-1. The symbol assignment unit 34-1 assigns the symbol value 2 to the second symbol from the lower side of the symbol string "0020" with the symbol value 2 skipped based on the variable $h_{2,j}=1$ so as to generate and output the symbol string "1020". Thus, the bit string "011001" is encoded into the symbol string "1020".

(Example of Encoding Bit String)

FIGS. 9 and 10 are diagrams illustrating an example of encoding of a bit string into a symbol string. In this example, the number of bits per bit string N is 6 bits, and the number of symbols per symbol string M is 4. The symbol values are 3 types including 0, 1, 2, and C=2. The distances $r_0, r_1, r_2$ of the symbols from the origin of the constellation are 0, 1, 2, respectively.

[Expression 16]

$$\sum (NK) = \sum_{i=0}^{T} \binom{N}{K^{(i)}} \qquad (16)$$

Tables G1, G3 list numerical values stored in the RAM 35, 36. The RAM 35, 36 may be memories independently of each other as illustrated in FIG. 3. However, the RAM 35, 36 is treated as a single memory for convenience herein. The RAM 35, 36 stores the variable T, the numbers of symbols $K_0^{(T)}$, $K_1^{(T)}$, $K_2^{(T)}$, the average power E of optical signals, the number of arrangement patterns (N·$K^{(T)}$), a total Σ (N·K) of the numbers of arrangement patterns (N·$K^{(T)}$), and the parameters $B_1^{(T)}$, $B_2^{(T)}$. The total Σ (N·K) is represented by expression (16) described above. The values of the variable T are assigned from 1 to 14 in ascending order of the average power E.

Tables G2, G4 list numerical examples used for calculation performed by the DM 11. The bit string, the integer value U, the difference $U^{(T)}$, the coefficients $v_1$, $v_2$, the variables $h_1^{(T)}$, $h_2^{(T)}$, and the symbol string correspond to the values in Tables G1, G3 in the horizontal direction of the pages of FIGS. 9 and 10. Table G5 lists the averages of the numbers of symbols $K_0^{(T)}$, $K_1^{(T)}$, $K_2^{(T)}$ and the average of the values of the average power E of the optical signal ("AVE"). Since the average of the number of symbols $K_0^{(T)}$ is the largest among the averages of the numbers of symbols $K_0^{(T)}$, $K_1^{(T)}$, $K_2^{(T)}$, it is understood that, as the distance from the center of the constellation reduces, the likelihood of assignment of the symbol increases.

The quantity pattern determination unit 31 calculates the difference $U^{(T)}$ ($U^{(S)}$) by performing the operation of expression (4) described above by using the total $\Sigma$ (N·K) in Tables G1, G3. As described above, the quantity pattern determination unit 31 determines the variable T that satisfies expressions (5) and (6) described above from the difference $U^{(T)}$.

The symbol arrangement calculation unit 32 obtains the parameters $B_1^{(T)}$, $B_2^{(T)}$ in Tables G2, G4 corresponding to the determined variable T and calculates the coefficients $v_1$, $v_2$ from the parameters $B_1^{(T)}$ and $B_2^{(T)}$ and the difference $U^{(T)}$ in accordance with expression (12) described above. As described above, the symbol arrangement calculation unit 32 determines the variable $h_1^{(T)}$, $h_2^{(T)}$ by executing the processing illustrated in FIG. 6 with the coefficients $v_1$, $v_2$. As has been described, the symbol generation unit generates a symbol string of the symbol arrangement in accordance with the variable $h_1^{(T)}$, $h_2^{(T)}$.

The quantity pattern determination unit 31 determines the variable T=6 by, for example, dividing the total $\Sigma$ (N·K) from the integer value "26" corresponding to the bit string "011010" to calculate the difference $U^{(T)}$ that satisfies Expressions (5) and (6). The symbol arrangement calculation unit 32 obtains the parameters $B_1^{(6)}=3$ and $B_2^{(6)}=4$ corresponding to the variable T=6, calculates the coefficients $v_1=0$ and $v_2=2$ from the difference $U^{(6)}=6$, and determines the variables $h_1^{(6)}=0$, $h_2^{(6)}=2$. Thus, the bit string "011010" is encoded into the symbol string "0201".

As described above, the DM11 determines the quantity pattern (variable T) of the bit string from the integer value U corresponding to the bit string, determines the arrangement pattern of the symbol string from the quantity pattern and the difference $U^{(T)}$ corresponding to the quantity pattern, and generates the symbol string. Thus, the encoding may be performed with the bit pattern of the bit string associated with the arrangement pattern of the symbol string. In the case of the example illustrated in FIGS. 9 and 10, it is possible to perform encoding in which the bit string of 64 patterns ($=2^6$) is associated with the symbol string of the 82 patterns ($=3^4$). Thus, compared to the following comparative example, loss of an entire conversion rate is reduced, and accordingly, the performance of the PS is Improved.

Figure 11:
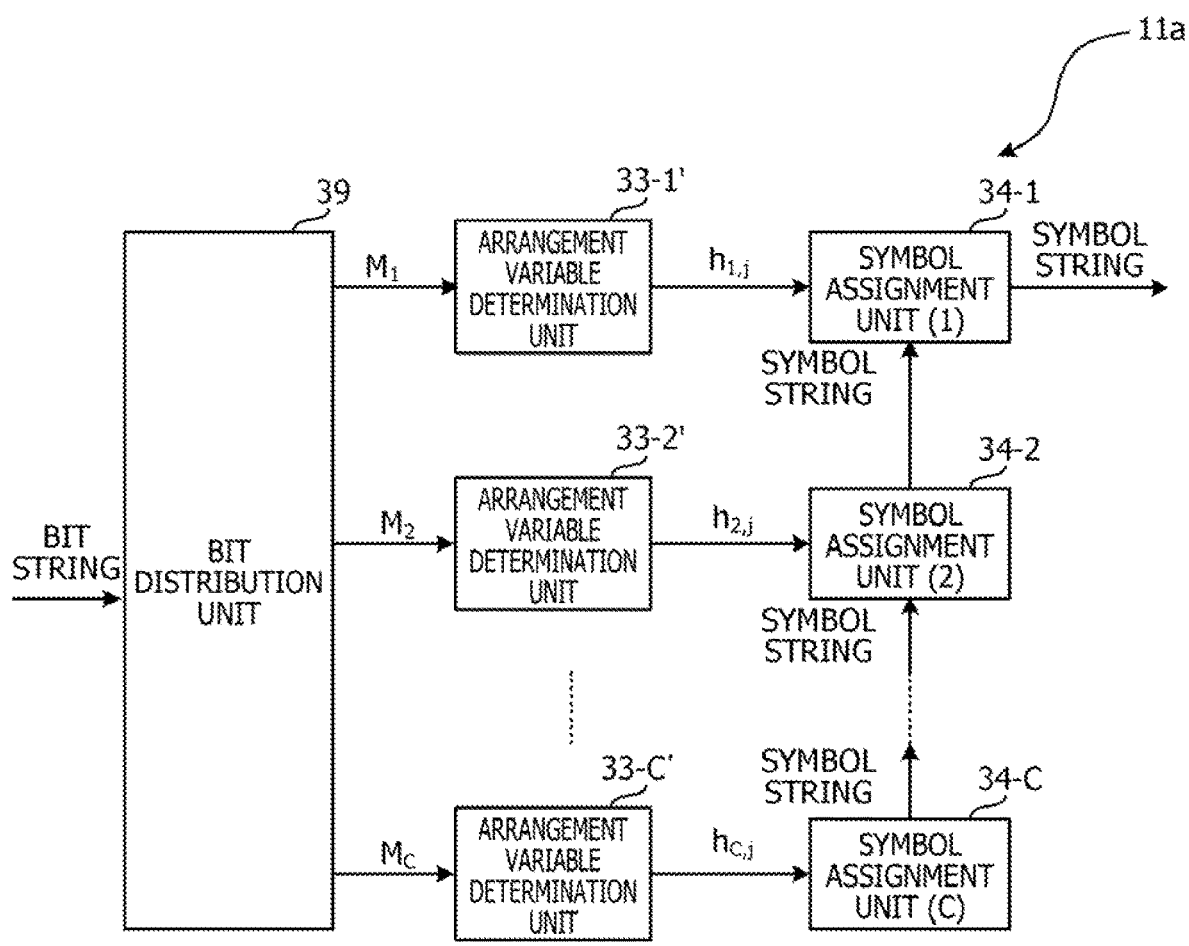
FIG. 11 is a configuration diagram illustrating DM according to a comparative example.

FIG. 11 is a configuration diagram illustrating DM 11a according to the comparative example. The DM 11a includes a bit distribution unit 39, arrangement variable determination units 33-1' to 33-C', and the symbol assignment units 34-1 to 34-C. In FIG. 11, configurations in common with those illustrated in FIG. 3 are denoted by the same reference signs and description thereof is omitted.

The bit distribution unit 39 divides an M-bit bit string into $M_1$, $M_2$, . . . , $M_C$-bit pieces of data and outputs the $M_1$, $M_2$, . . . , $M_C$-bit pieces of data to the arrangement variable determination units 33-1' to 33-C', respectively. The arrangement variable determination units 33-1' to 33-C' determine the symbol arrangement variables $h_{1,j}$, $h_{2,j}$, . . . , $h_{C,j}$ from the $M_1$, $M_2$, . . . , $M_C$-bit pieces of data, respectively, by using predetermined calculation means.

In this example, the granularity of the bit data input to each of the arrangement variable determination units 33-1' to 33-C' is a power of 2 and coarse. Accordingly, to convert each piece of the bit data on the input side and the output side by the DM in a one-to-one relationship, there may be cases where an excessively large number of patterns of the symbol string on the output side are desired for the number of patterns of the bit data on the input side of the individual arrangement variable determination units 33-1' to 33-C'. For example, there may be cases where a single symbol is added to the symbol string on the output side because the number of patterns of the symbol string on the output side is, for example, one pattern short for the number of patterns of the bit data on the input side of the individual arrangement variable determination units 33-1' to 33-C'. In this case, even when a single symbol is added to the symbol string on the output side, only a single pattern is used among the patterns of the symbol string increased by the addition. Consequently, only a small number of patterns are used despite a significant increase in the number of usable patterns. This leads to the increase in the loss of the conversion rate, and the performance of the PS is degraded compared to the DM 11 according to the embodiment.

(Configuration of Inverse-DM)

Figure 12:
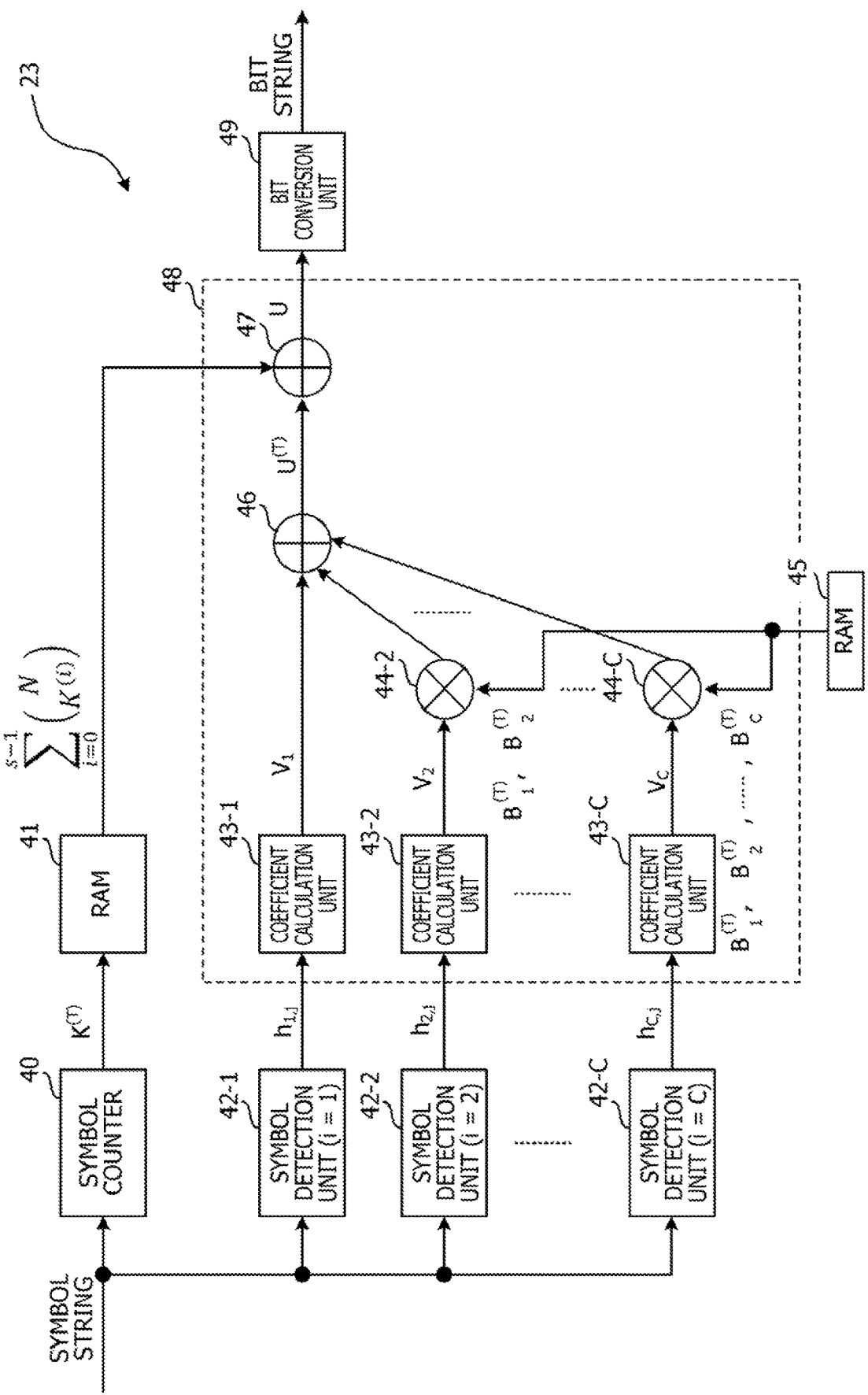
FIG. 12 is a configuration diagram illustrating an example of inverse-DM.

FIG. 12 is a configuration diagram illustrating an example of the inverse-DM 23. The inverse-DM 23 decodes the symbol string into the bit string by executing the encoding process of the DM 11 in inverse order. The inverse-DM 23 is an example of a decoding device.

The Inverse-DM 23 includes a symbol counter 40, symbol detection units 42-1, 42-2, . . . , 42-C, an integer value calculation unit 48, a bit conversion unit 49, and RAMs 41 and 45. The RAMs 41, 45 store at least a subset of the values of Tables G1, G3. The inverse-DM 23 includes hardware that includes at least a subset of, for example, a CPU, a memory, an FPGA, an ASIC, and so forth.

The symbol counter 40 is an example of a counting unit and counts the quantity for each of the symbol values included in a symbol string. For example, the symbol counter 40 counts the numbers of symbols $K_0$, $K_1$, $K_2$, . . . , $K_C$ of the individual symbol values 0, 1, . . . , C. The symbol counter 40 outputs the numbers of symbols $K_0$, $K_1$, $K_2$, . . . , $K_C$ ($K^{(T)}$) to the RAM 41.

The RAM 41 stores the numbers of symbols $K_0$, $K_1$, $K_2$, . . . , $K_C$ ($K^{(T)}$) and the total $\Sigma$ (N·$K^{(T)}$) of the numbers of arrangement patterns (see expression (16)). The RAM 41 outputs the total $\Sigma$ (N·$K^{(T)}$) corresponding to the numbers of symbols $K_0$, $K_1$, $K_2$, . . . , $K_C$ to the integer value calculation unit 48. The total $\Sigma$ (N·$K^{(T)}$) corresponds to the second term of the right side of expression (4) described above.

The symbol detection units 42-1, 42-2, . . . , 42-C are examples of a detection unit and respectively detect the positions of the symbol values 0, 1, . . . , C in the symbol string. The symbol detection units 42-1, 42-2, . . . , 42-C detect the positions in accordance with the method described with reference to FIG. 7, thereby respectively detecting the symbol arrangement variables $h_{1,j}$, $h_{2,j}$, . . . , $h_{C,j}$. The symbol detection units 42-1, 42-2, . . . , 42-C respectively output the variables $h_{1,j}$, $h_{2,j}$, . . . , $h_{C,j}$ to the integer value calculation unit 48.

The integer value calculation unit 48 calculates the integer value U from the numbers of symbols $K_0$, $K_1$, $K_2$, . . . , $K_C$ ($K^{(T)}$), the positions of the individual symbol values in the symbol string, and the parameters $B_1^{(T)}$, $B_2^{(T)}$, . . . , $B_C^{(T)}$. The integer value calculation unit 48 includes coefficient calculation units 43-1, 43-2, . . . , 43-C, adders 46 and 47, and multipliers 44-2, . . . , 44-C. The symbol detection units 42-1, 42-2, . . . , 42-C respectively output the variables $h_{1,j}$, $h_{2,j}$, . . . , $h_{C,j}$ to the coefficient calculation units 43-1, 43-2, . . . , 43-C. The coefficient calculation units 43-1, 43-2, . . . , 43-C calculate the coefficients $v_1$, $v_2$, . . . , $v_C$ by, for example, the following processing.

Figure 13:
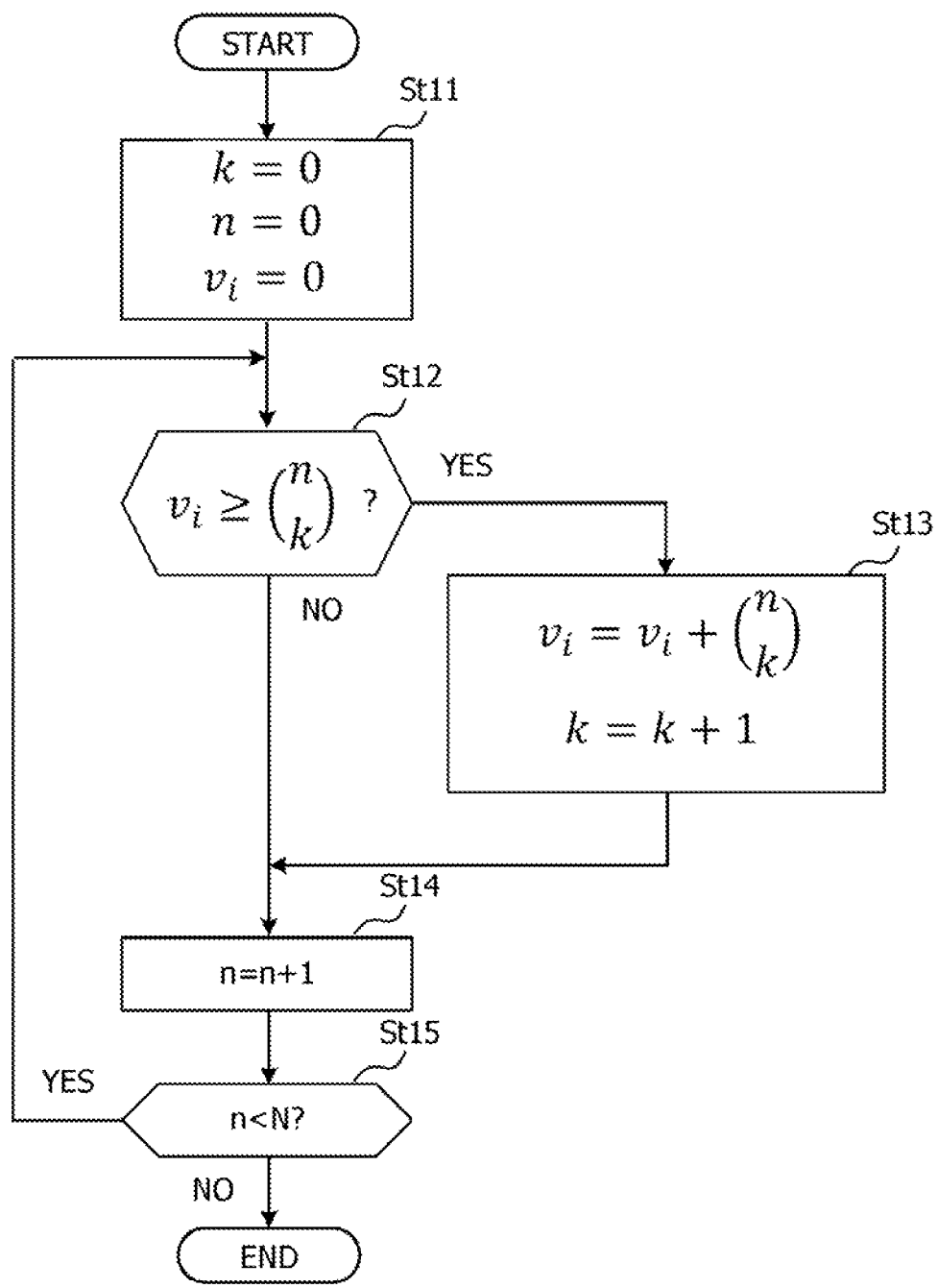
FIG. 13 is a flowchart illustrating an example of processing of calculating coefficients.

FIG. 13 is a flowchart illustrating an example of processing of calculating the coefficients $v_1$, $v_2$, . . . , $v_C$. This processing is individually performed by the coefficient calculation units 43-1, 43-2, . . . , 43-C. The coefficient calculation units 43-1, 43-2, . . . , 43-C initially set 0 to the variables k, n and the coefficient $v_i$ (step St11). In the coefficient calculation units 43-1, 43-2, ..., 43-C, i is 1, 2, ..., C.

Next, the coefficient calculation units 43-1, 43-2, ..., 43-C compare the coefficient $v_i$ with the binomial coefficient (n·k) (step St12). When the coefficient $v_i$ is greater than or equal to the binomial coefficient (n·k) (Yes in step St12), the coefficient calculation units 43-1, 43-2, ..., 43-C add the binomial coefficient (n·k) to the coefficient $v_i$ and add 1 to the variable k (step St13). When the coefficient $v_i$ is smaller than the binomial coefficient (n·k) (No in step St12), the process in step St13 is not performed.

Next, the coefficient calculation units 43-1, 43-2, ..., 43-C add 1 to the variable n (step St14). Next, the coefficient calculation units 43-1, 43-2, ..., 43-C compare the variable n with the number of symbols N (step St15). When n<N (Yes in step St15), the processes in and after step St12 are executed again. When n≥N (No in step St15), the processing ends.

Referring again to FIG. 12, the coefficient calculation unit 43-1 outputs the coefficient $v_1$ to the adder 46. The coefficient calculation units 43-2, ..., 43-C output the coefficient $v_2$, ..., $v_C$ to the multipliers 44-2, ..., 44-C, respectively.

The RAM 45 stores the parameters $B_1^{(T)}, B_2^{(T)}, \ldots, B_C^{(T)}$ corresponding to the coefficient $v_2, \ldots, v_C$. The multipliers 44-2, ..., 44-C obtain the parameters $B_1^{(T)}, B_1^{(T)}, \ldots, B_C^{(T)}$ from the RAM 45. The multiplier 44-2 obtains the parameters $B_1^{(T)}, B_2^{(T)}$, multiplies the coefficient $v_2$ by the parameters $B_1^{(T)}, B_2^{(T)}$, and outputs the results to the adder 46. The multiplier 44-C obtains the parameters $B_1^{(T)}, B_2^{(T)}, \ldots, B_C^{(T)}$, multiplies the coefficient $v_C$ by the parameters $B_1^{(T)}, B_2^{(T)}, \ldots, B_C^{(T)}$, and outputs the results to the adder 46. Thus, the multipliers 44-2, ..., 44-C perform the operations of the terms on the right side of expression (11) described above, respectively.

The adder 46 adds the input values from the coefficient calculation units 43-1, 43-2, ..., 43-C. Thus, the adder 46 executes the operation of expression (11) described above to calculate the difference $U^{(T)}$. The adder 46 outputs the difference $U^{(T)}$ to the adder 47.

The adder 47 calculates by adding the difference $U^{(T)}$ to the total $\Sigma$ (N·$K^{(T)}$) of the numbers of arrangement patterns. For example, the adder 47 calculates the integer value U as the sum of the difference $U^{(T)}$ and the total $\Sigma$ (N·$K^{(T)}$) of the numbers of arrangement patterns based on expression (4) described above. The adder 47 outputs the integer value U to the bit conversion unit 49. The bit conversion unit 49 converts the integer value U into a bit string and outputs the bit string.

In this way, the inverse-DM 23 is able to decode the symbol string into the bit string. Accordingly, the inverse-DM 23 may obtain the same effects as those of the DM 11. The transmission apparatus 1 including the DM 11 and the reception apparatus 2 including the inverse-DM 23 may also obtain the same effects as those described above.

The above-described embodiment is an example of the embodiment of the present disclosure. However, this does not limit the embodiment. The embodiment is able to be made by being varied in a variety of manners without departing from the gist thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An encoding device comprising:
   a memory; and
   a processor coupled to the memory and configured to:
      determine, based on an integer value that corresponds to a bit string of a predetermined amount, quantities for a predetermined number of individual symbol values included in a symbol string encoded from the bit string of the predetermined amount,
      specify positions of symbols in the symbol string for the individual symbol values from the quantities for the individual symbol values and a first parameter related to a number of arrangement patterns of the symbols that corresponds to the quantities for the individual symbol values, and
      generate the symbol string by assigning to the specified positions the corresponding symbol values.

2. The encoding device according to claim 1, wherein the processor determines the quantities for the predetermined number of individual symbol values from a result of comparison between the integer value and the number of the arrangement patterns of the symbols obtained from a plurality of patterns of the quantities for the predetermined number of the individual symbol values.

3. The encoding device according to claim 1, wherein the memory stores second parameters related to calculation of the first parameter for the individual quantities for the individual symbol values,
   the processor obtains from the memory the second parameters that correspond to the quantities for the individual symbol values, and
   the processor uses the second parameters for calculation of the positions of the symbols in the symbol string.

4. The encoding device according to claim 1, wherein the memory stores the number of the arrangement patterns of the symbols, wherein
   the processor obtains the number of the arrangement patterns of the symbols from the memory.

5. A decoding device comprising:
   a memory; and
   a processor coupled to the memory and configured to:
      count quantities for a predetermined number of individual symbol values included in a symbol string encoded from a bit string of a predetermined amount;
      detect positions in the symbol string for the predetermined number of the individual symbol values, and
      specify an integer value that corresponds to the bit string of the predetermined amount from the quantities for the predetermined number of the individual symbol values, the positions for the predetermined number of the individual symbol values included in the symbol string, and a parameter related to a number of arrangement patterns of symbols included in the symbol string.

6. A transmission device comprising:
   a processor configured to:
      determine, based on an integer value that corresponds to a bit string of a predetermined amount, quantities for a predetermined number of individual symbol values included in a symbol string encoded from the bit string of the predetermined amount, specify positions of symbols in the symbol string for the individual symbol values from the quantities for the individual symbol values and a first parameter related to a number of arrangement patterns of the symbols that corresponds to the quantities for the individual symbol values, and generate the symbol string by assigning to the specified positions the corresponding symbol values;

a light source configured to output transmission light; and a transmitter configured to generate and transmit an optical signal by optically modulating the transmission light based on the symbol string.

7. The transmission device according to claim 6, wherein the processor determines the quantities for the predetermined number of individual symbol values from a result of comparison between the integer value and the number of the arrangement patterns of the symbols obtained from a plurality of patterns of the quantities for the predetermined number of the individual symbol values.

8. The transmission device according to claim 6, further comprising:

a memory configured to store second parameters related to calculation of the first parameter for the individual quantities for the individual symbol values, wherein the processor obtains from the memory the second parameters that correspond to the quantities for the individual symbol values, and the processor uses the second parameters for calculation of the positions of the symbols in the symbol string.

9. The encoding device according to claim 6, further comprising:

a memory configured to store the number of the arrangement patterns of the symbols, wherein the processor obtains the number of the arrangement patterns of the symbols from the memory.

* * * * *